United States Patent
Badt, Jr.

(10) Patent No.: US 8,238,875 B2
(45) Date of Patent: Aug. 7, 2012

(54) JAMMING PRESENCE

(75) Inventor: Sig Harold Badt, Jr., Richardson, TX (US)

(73) Assignee: Alcatel Lucent, Paris (FR)

( * ) Notice: Subject to any disclaimer, the term of this patent is extended or adjusted under 35 U.S.C. 154(b) by 934 days.

(21) Appl. No.: 11/302,557

(22) Filed: Dec. 13, 2005

(65) Prior Publication Data

US 2007/0135036 A1 Jun. 14, 2007

(51) Int. Cl.
*H04M 1/66* (2006.01)

(52) U.S. Cl. ............ 455/411; 455/412.1; 455/413; 455/414.1; 455/456.1; 455/456.4

(58) Field of Classification Search ............ 455/414.1, 455/414.2, 417, 435.1, 411, 412.1, 413, 456.1, 455/456.4

See application file for complete search history.

(56) References Cited

U.S. PATENT DOCUMENTS

| | | | |
|---|---|---|---|
| 2004/0176083 A1* | 9/2004 | Shiao et al. | 455/417 |
| 2004/0203423 A1 | 10/2004 | Kurhila | |
| 2004/0253963 A1* | 12/2004 | Park et al. | 455/456.2 |
| 2005/0009537 A1 | 1/2005 | Crocker | |
| 2005/0181808 A1* | 8/2005 | Vaudreuil | 455/456.3 |
| 2005/0215252 A1 | 9/2005 | Jung | |
| 2006/0093121 A1* | 5/2006 | Sylvain | 379/220.01 |
| 2006/0116175 A1* | 6/2006 | Chu | 455/567 |
| 2006/0281486 A1* | 12/2006 | Ngai et al. | 455/552.1 |
| 2007/0127676 A1* | 6/2007 | Khadri | 379/211.02 |
| 2010/0197324 A1* | 8/2010 | Bolin et al. | 455/456.3 |

OTHER PUBLICATIONS

Universal Mobile Telecommunications System (UMTS); Presence service; Architecture and functional description; Stage 2 (3GPP TS 23.141 version 6.7.0 Release 6); ETSI TS 123 141.
"Jam That Ringing Cell Phone?" EDN Electrical Design News, Reed Business Information, vol. 48, No. 5, Mar. 6, 2003, p. 40, 42, 44 XP001160000 ISSN:0012-7515.

* cited by examiner

*Primary Examiner* — Danh Le
*Assistant Examiner* — Khai M Nguyen
(74) *Attorney, Agent, or Firm* — RG & Associates

(57) ABSTRACT

A system, method, and computer readable medium to provide alternative communications during jamming in a presence system, that comprises, registering a mobile device as a presentity to a presence server in the presence system, detecting a communication jamming of the mobile device, providing information related to the detected communication jamming as a state information to the presence server, and upon attempting to communicate with the mobile device while being jammed, providing the state information and offering an alternative communication suggestion.

20 Claims, 2 Drawing Sheets

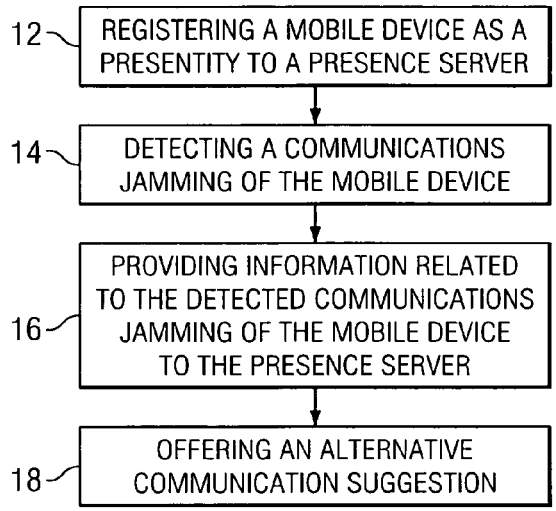
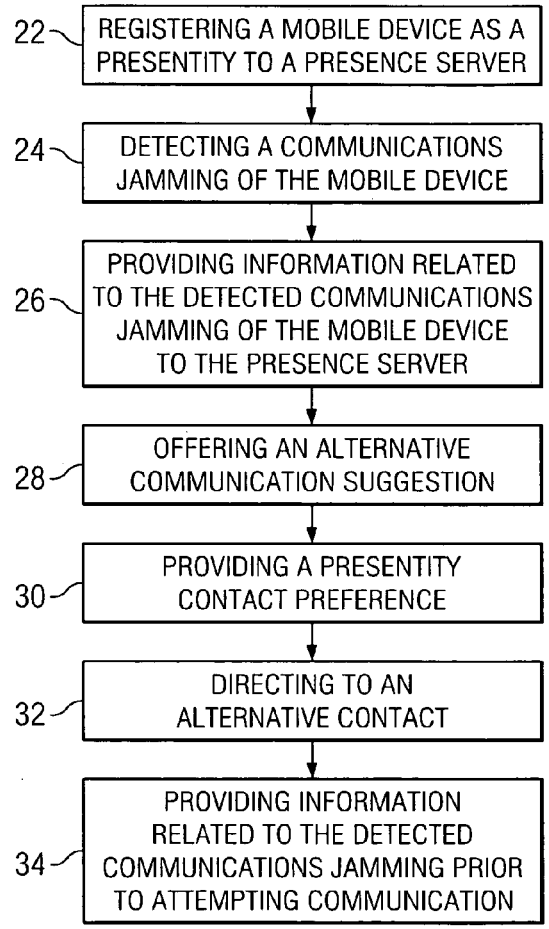
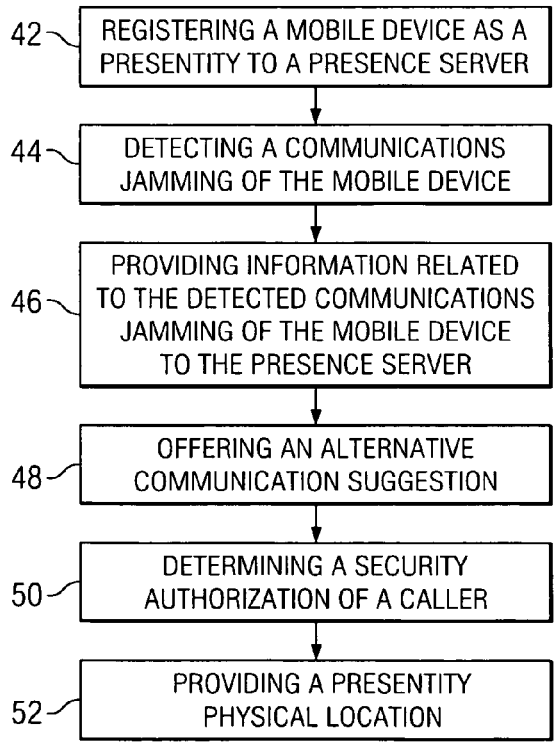

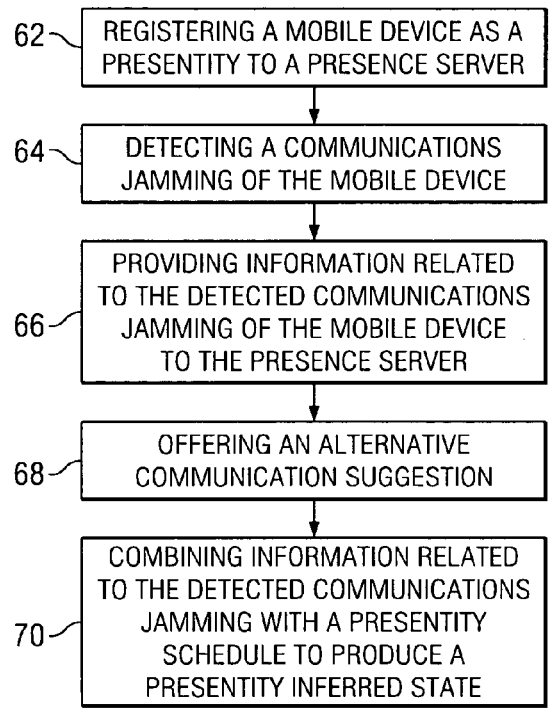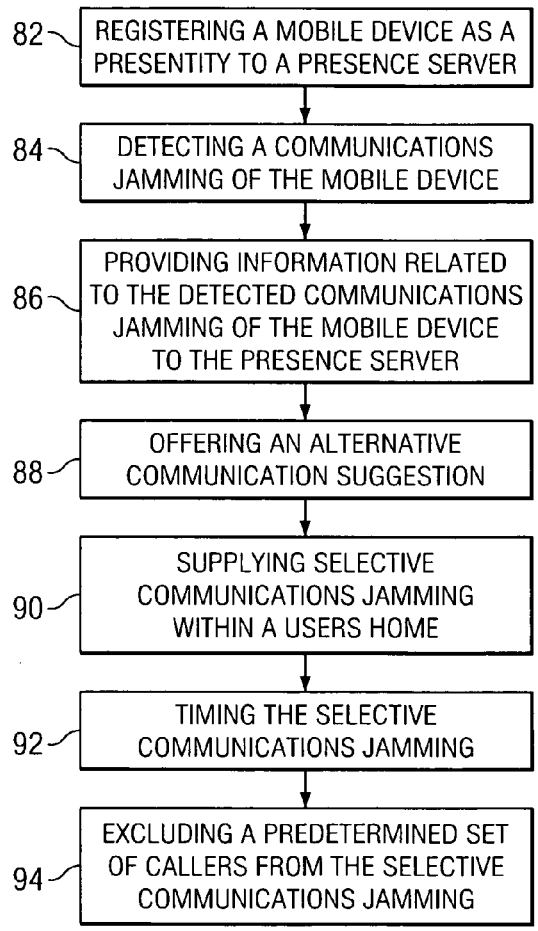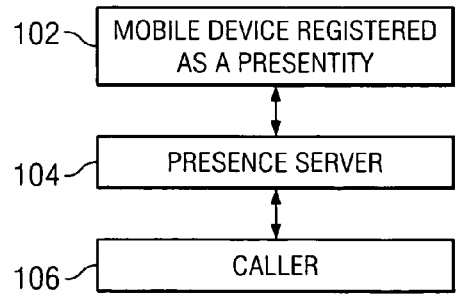

JAMMING PRESENCE

BACKGROUND OF THE INVENTION

Presence is generally defined as knowing that a person is available via, for example, a certain device over a particular medium as soon as a user connects to the network. For instance, via presence information, it may be ascertained that the person is available online, and on a connected device with a certain device profile. The user which indicates its presence on the network is termed a presentity. Presence is used to notify a group of watchers in a contact list about the state of person, including availability. When the user changes its presence state, each contact on the contact list is informed about the new presence state of the user. Presence infrastructure is used predominantly with Instant Messaging (IM) or Short Message Service (SMS) on a computer. However, the distinction between computers, personal digital assistants and cellular telephones has been progressively blurring which allows a cross over of functionality between one type of Internet Protocol (IP) device to another.

Radio jamming techniques are sometimes used either to block the use of cellular telephones in certain areas, or to notify a cellular telephone that it is in a restricted area and certain types of communication are not recommended or allowed. Cellular telephone jamming can be a legitimate tool for certain applications. For example, jamming can be used to prevent cellular telephone calls from interrupting a church service or a theater presentation through either blocking or ring restriction. The problem is, even when jamming is used for legitimate purposes, it can still have negative side effects. For example, jamming can prevent reception of emergency cellular telephone calls.

The present invention addresses negative side effects that can result from legitimate jamming such as a caller not knowing the person being called is in the restricted area such as in a theater. Current jamming devices may cause a cellular telephone to switch from ringer to vibrate mode. If the person in the theater receives an incoming cellular telephone call, that person may choose to answer the cellular telephone, but answering the cellular telephone may take time as the person leaves the theater and walks to the lobby. If the caller is unaware that the person is in the restricted area, the caller may hang up before the person receiving the call can answer. Presence can be used to communicate to a potential caller (the watcher) that the person receiving the call (the presentity) is in the restricted area.

Therefore, what is needed is a method of extending the presence system to cellular telephones to overcome negative side effects associated with jamming. More specifically, the present invention provides alternative communications during jamming in a presence system.

SUMMARY OF THE INVENTION

Presence is a technology in which information about one person, place, or thing is communicated to another person, place, or thing. In presence terminology, a person, place, or thing about which information is being collected is called a presentity, and a person, place, or thing receiving presence information is called a watcher. Currently, presence is widely used in Instant Messaging (IM) systems and is used to communicate to one IM user (the watcher) that another IM user (the presentity) is online and available for communication.

The present invention relates to using presence technology to inform a caller that the cellular telephone he or she is calling is being jammed. Cellular telephone jamming can be a legitimate tool for certain applications. However, even when jamming is used for legitimate applications it can still have negative effects. Some of the negative effects include a caller to a jammed cellular telephone does not know the telephone is being jammed and another is to prevent reception of emergency telephone calls.

The present invention addresses negative side effects that can happen as a result of legitimate jamming. That is that a caller does not know a person being called is in a restricted area. For example, in a theater, a sophisticated jamming device may cause a cellular telephone to switch from ringer to vibrate mode. If a person in the theater receives an incoming telephone call, that person may choose to answer the telephone, but answering the telephone may take some time. The person may have to leave the theater and walk to the lobby. If the caller does not know what's going on, the caller may hang up before the person receiving the call can answer. The jamming device can provide extra information to a cellular telephone or a cellular network. For example, in a theater, a jamming device may tell a cellular telephone, the location of the theater and when the show will be over. In another example, a jamming device may tell a cellular telephone that the person being jammed is in a class, in surgery or in a meeting. The jamming device may give the name of a person to contact, like a theater usher, in the case of an emergency. All this information and other information of this type can be included in data sent by the jamming device.

Presence can be used to communicate to a potential caller (the watcher) that the person receiving the call (the presentity) is in a restricted location. This presence information can be available to the watcher before the watcher initiates the telephone call. The presence information communicated to the watcher may contain a list of alternative ways to contact the presentity. In one embodiment of the invention the presence information may inform the watcher that the presentity is unavailable by direct telephone call but is available by voice mail, Instant Messaging (IM), or e-mail. The presence information may also contain a list of the presentity's preferences. For example, the presence information may say that while the presentity is in a restricted area, the presentity prefers to be contacted by e-mail.

An individual may also have a personal jamming device in his or her home. The jamming device may tell the cellular telephones in the user's home that the person is asleep or doing something important.

The presence system can combine information from a jamming device with information from other sources to produce an inferred state information. This is information about the presentity calculated from data collected by the presence system. For example, information from the jamming device can be combined with information from a person's calendar to produce an inferred estimate of when the presentity will be available in the future.

In one embodiment of the present invention, a method for to provide alternative communications during jamming in a presence system, that comprises, registering a mobile device as a presentity to a presence server in the presence system, detecting a communication jamming of the mobile device, providing information related to the detected communication jamming as a state information to the presence server, and upon attempting to communicate with the mobile device while being jammed, providing the state information and offering an alternative communication suggestion. The method may also provide a presentity contact preference, wherein the alternative communication suggestion is voice mail, instant messaging or e-mail. The method may also determine a security authorization of at least one of a caller, and a service attempting to communicate with the mobile device. The method may provide a presentity physical location, direct to an alternative contact, and upon attempting to communicate with the mobile device, providing at least one of a caller, and a device attempting to communicate with the mobile device, with an alternative contact information. The method may combine the information related to the detected communication jamming with a presentity schedule to produce a presentity inferred state and provide the information related to the detected communication jamming prior to attempting the communication.

In another embodiment of the present invention, a computer readable medium comprises instructions for registering a mobile device as a presentity to a presence server, detecting a communication jamming of the mobile device, and providing the information related to the detected communication jamming as a state information to the presence server. The computer readable medium may comprise instructions to supply selective communications jamming within a user's home wherein the selective jamming is timed and wherein the selective jamming excludes a pre-determined set of callers. The computer readable medium may determine a security authorization of at least one of a caller, and a device attempting to communicate with the mobile device and combine the information related to the detected communication jamming with a presentity schedule to produce a presentity inferred state.

In yet a further embodiment, a system adapted to provide alternative communications during jamming in a presence system, that comprises, a mobile device registered as a presentity on the presence system, and a presence server on the presence system, the presence server adapted to detect communication jamming of the mobile device, and provide the information related to the detected communication jamming as a state information to the presence server. Whereupon attempting to contact the mobile device while being jammed, at least one of a caller, and a device attempting to communicate with the mobile device, is provided with the state information and offered an alternative communication suggestion. The system may combine the information related to the detected communication jamming with a presentity schedule to produce a presentity inferred state.

BRIEF DESCRIPTION OF THE DRAWINGS

FIG. 1 depicts a first jamming presence block diagram in accordance with a preferred embodiment of the present invention;

FIG. 2 depicts a second jamming presence block diagram in accordance with a preferred embodiment of the present invention;

FIG. 3 depicts a third jamming presence block diagram in accordance with a preferred embodiment of the present invention;

FIG. 4 depicts a fourth jamming presence block diagram in accordance with a preferred embodiment of the present invention;

FIG. 5 depicts a first computer readable medium of the method in accordance with a preferred embodiment of the present invention; and FIG. 6 depicts a jamming presence system in accordance with a preferred embodiment of the present invention.

DETAILED DESCRIPTION OF THE INVENTION

Referring now to FIG. 1, a method for providing 10 alternative communications jamming in a presence system. The present invention comprises, registering 12 a mobile device as a presentity to a presence server in the presence system, detecting 14 a communication jamming of the mobile device, providing 16 information related to the detected communication jamming as a state information to the presence server, and upon attempting to communicate with the mobile device while being jammed, providing the state information and offering 18 an alternative communication suggestion. The method may also provide a presentity contact preference, wherein the alternative communication suggestion is voice mail, instant messaging or e-mail. The steps performed in this figure are performed by software, hardware, firmware, and/or the combination of software, hardware, and/or firmware. The transfer of information between the mobile device and the presence server occurs via at least one of a wireless protocol, a wired protocol and the combination of the wireless protocol and the wired protocol.

Referring now to FIG. 2, a method for providing 20 alternative communications jamming in a presence system. The present invention comprises, registering 22 a mobile device as a presentity to a presence server in the presence system, detecting 24 a communication jamming of the mobile device, providing 26 information related to the detected communication jamming as a state information to the presence server, and upon attempting to communicate with the mobile device while being jammed, providing the state information and offering 28 an alternative communication suggestion. The method may provide 30 a presentity contact preference, direct 32 to an alternative contact and provide 34 the information related to the detected communication jamming prior to attempting the communication. The steps performed in this figure are performed by software, hardware, firmware, and/or the combination of software, hardware, and/or firmware. The transfer of information between the mobile device and the presence server occurs via at least one of a wireless protocol, a wired protocol and the combination of the wireless protocol and the wired protocol.

Referring now to FIG. 3, a method for providing 40 alternative communications jamming in a presence system. The present invention comprises, registering 42 a mobile device as a presentity to a presence server in the presence system, detecting 44 a communication jamming of the mobile device, providing 46 information related to the detected communication jamming as a state information to the presence server, and upon attempting to communicate with the mobile device while being jammed, providing the state information and offering 48 an alternative communication suggestion. The method may also determine 50 a security authorization of at least one of a caller, and a service attempting to communicate with the mobile device. The method may also provide 52 a presentity physical location. The steps performed in this figure are performed by software, hardware, firmware, and/or the combination of software, hardware, and/or firmware. The transfer of information between the mobile device and the presence server occurs via at least one of a wireless protocol, a wired protocol and the combination of the wireless protocol and the wired protocol.

Referring now to FIG. 4, a method for providing 60 alternative communications jamming in a presence system. The present invention comprises, registering 62 a mobile device as a presentity to a presence server in the presence system, detecting 64 a communication jamming of the mobile device, providing 66 information related to the detected communication jamming as a state information to the presence server, and upon attempting to communicate with the mobile device while being jammed, providing the state information and offering 68 an alternative communication suggestion. The method may combine 70 the information related to the detected communication jamming with a presentity schedule to produce a presentity inferred state. The steps performed in this figure are performed by software, hardware, firmware, and/or the combination of software, hardware, and/or firmware. The transfer of information between the mobile device and the presence server occurs via at least one of a wireless protocol, a wired protocol and the combination of the wireless protocol and the wired protocol.

Referring now to FIG. 5, an algorithm block diagram 80 for the present invention This algorithm is preferably embodied in a computer readable medium or software but may also be embodied in firmware and is utilized via hardware. The present invention comprises, registering 82 a mobile device as a presentity to a presence server in the presence system, detecting 84 a communication jamming of the mobile device, providing 86 information related to the detected communication jamming as a state information to the presence server, and upon attempting to communicate with the mobile device while being jammed, providing the state information and offering 88 an alternative communication suggestion. The computer readable medium may comprise instructions to supply 90 selective communications jamming within a user's home wherein the selective jamming is timed 92 and wherein the selective jamming excludes 94 a pre-determined set of callers. The steps performed in this figure are performed by software, hardware, firmware, and/or the combination of software, hardware, and/or firmware. The transfer of information between the mobile device and the presence server occurs via at least one of a wireless protocol, a wired protocol and the combination of the wireless protocol and the wired protocol.

Referring now to FIG. 6, for providing 100 alternative communications jamming in a presence system, that comprises, a mobile device 102 registered as a presentity on the presence system, and a presence server 104 on the presence system, the presence server adapted to detect communication jamming of the mobile device, and provide the information related to the detected communication jamming as a state information to the presence server. Whereupon attempting to contact the mobile device while being jammed, at least one of a caller 106, and a device attempting to communicate with the mobile device, is provided with the state information and offered an alternative communication suggestion. These blocks or modules are software, hardware, firmware, and/or the combination of software, hardware, and/or firmware. The transfer of information between the mobile device and the presence server occurs via at least one of a wireless protocol, a wired protocol and the combination of the wireless protocol and the wired protocol. For example, the presence infrastructure may be accessed by the cellular phone or the computer with external wireless capability (such as the wireless card) or internal wireless capability (such as 802.11 or any of the other 802 variants), or by the Internet Protocol enabled phone. The communications coupling occurs via at least one of the wireless protocol, the wired protocol and the combination of the wireless protocol and the wired protocol.

Although an exemplary embodiment of the system of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the mobile device and the presence server. Also, these capabilities may be performed in the current manner or in a distributed manner and on, or via, any device able to provide and/or receive scheduling information. Further, although depicted in a particular manner, various modules or blocks may be repositioned without departing from the scope of the current invention. For example, the functionality performed by the presence server can be performed by the mobile device. Still further, although depicted in a particular manner, a greater or lesser number mobile devices, presence servers and callers or device attempting to communicate with the mobile device can be utilized with the present invention. Further, a lesser or greater number of mobile devices, presence servers and callers or devices attempting to communicate with the mobile device may be utilized with the present invention in order to accomplish the present invention, to provide additional known features to the present invention, and/or to make the present invention more efficient.

What is claimed is:

1. A method to provide alternative communications during jamming in a presence system, comprising:
   registering a mobile device as a presentity to a presence server in the presence system;
   detecting a communication jamming of the mobile device;
   providing information related to the detected communication jamming as a state information to the presence server; and
   upon attempting to communicate with the mobile device while being jammed, selecting an alternative communication suggestion that is dependent on a physical location of the presentity and an inferred estimate of when the presentity will be available in the future, and providing the alternative communication suggestion as state information to the presence server.

2. The method of claim 1 comprising providing a presentity contact preference.

3. The method of claim 1 wherein the alternative communication suggestion is voice mail.

4. The method of claim 1 wherein the alternative communication suggestion is instant messaging.

5. The method of claim 1 wherein the alternative communication suggestion is e-mail.

6. The method of claim 1 comprising determining a security authorization of at least one of:
   a caller; and
   a device attempting to communicate with the mobile device.

7. The method of claim 1 comprising providing a presentity physical location.

8. The method of claim 1 comprising directing to an alternative contact.

9. The method of claim 1 comprising upon attempting to communicate with the mobile device, providing at least one of:
   a caller; and
   a device attempting to communicate with the mobile device,
   with an alternative contact information.

10. The method of claim 1 comprising combining the information related to the detected communication jamming with a presentity schedule to produce a presentity inferred state.

11. The method of claim 1 comprising providing the information related to the detected communication jamming prior to attempting the communication.

12. A non-transitory computer readable medium comprising instructions for:
   registering a mobile device as a presentity to a presence server;

detecting a communication jamming of the mobile device; and selecting an alternative communication suggestion that is dependent on a physical location of the presentity and an inferred estimate of when the presentity will be available in the future, and providing the alternative communication suggestion as state information to the presence server.

13. The non-transitory computer readable medium of claim 12 comprising instructions for supplying selective communications jamming within a user's home.

14. The non-transitory computer readable medium of claim 13 wherein the selective jamming is timed.

15. The non-transitory computer readable medium of claim 13 wherein the selective jamming excludes a pre-determined set of callers.

16. The non-transitory computer readable medium of claim 12 comprising determining a security authorization of at least one of:
   a caller; and
   a device attempting to communicate with the mobile device.

17. The non-transitory computer readable medium of claim 12 comprising instructions for combining the information related to the detected communication jamming with a presentity schedule to produce a presentity inferred state.

18. A system adapted to provide alternative communications during jamming in a presence system, comprising:
   a mobile device registered as a presentity on the presence system; and
   a presence server on the presence system, the presence server adapted to:
      detect communication jamming of the mobile device;
      receive an alternative communication suggestion that is dependent on a physical location of the presentity and an inferred estimate of when the presentity will be available in the future; and
      provide the alternative communication suggestion as state information to at least one watcher of the mobile device.

19. The system of claim 18 wherein upon attempting to contact the mobile device while being jammed, at least one of:
   a caller; and
   a device attempting to communicate with the mobile device,
   is provided with the state information and offered an alternative communication suggestion.

20. The system of claim 18 wherein the presence server combines the information related to the detected communication jamming with a presentity schedule to produce a presentity inferred state.

* * * * *